United States Patent [19]
Michels et al.

[11] Patent Number: 5,640,429
[45] Date of Patent: Jun. 17, 1997

[54] MULTICHANNEL NON-GAUSSIAN RECEIVER AND METHOD

[75] Inventors: James H. Michels, Rome, N.Y.; Muralidhar Rangaswamy, Burlington, Mass.

[73] Assignee: The United States of America as represented by the Secretary of the Air Force, Washington, D.C.

[21] Appl. No.: 376,959

[22] Filed: Jan. 20, 1995

[51] Int. Cl.$^6$ .................................................. H03D 1/00
[52] U.S. Cl. .................... 375/340; 375/345; 375/349; 375/350; 364/516; 364/572; 364/574; 364/724.19; 455/303; 342/91; 342/93; 342/378
[58] Field of Search ....................... 375/229–232, 375/316, 345, 346, 349, 350, 340; 364/514 R, 515.01, 516, 550, 570, 572, 574, 724.01, 724.19, 734; 342/89, 91, 93, 378; 324/76.11, 76.12, 76.19, 77.11, 76.29; 455/296, 303

[56] References Cited

U.S. PATENT DOCUMENTS

| | | | |
|---|---|---|---|
| 4,855,932 | 8/1989 | Cangiani et al. | 364/516 |
| 5,018,088 | 5/1991 | Higbie | 364/574 |
| 5,168,215 | 12/1992 | Puzzo | 324/78 F |
| 5,272,698 | 12/1993 | Champion | 370/62 |

*Primary Examiner*—Stephen Chin
*Assistant Examiner*—Amanda T. Le
*Attorney, Agent, or Firm*—William G. Auton

[57] ABSTRACT

A process and system for improving the detection of signals in additive correlated non-Gaussian noise using multichannel data. This improves detection performance of receivers through the signal processing architecture when the observation data $X(n)$ is first split into an upper and lower path. In the upper path, the known signal is first subtracted from the data and then passed directly to the prediction error filter. The output of the prediction error filters are then input to the zero-mean non-linear processor and their associated estimated variances are used to determine $H_0$ and $H_1$ where $H_0$ denotes the condition where no signal is present in the data and $H_1$ denotes the signal present case.

16 Claims, 8 Drawing Sheets

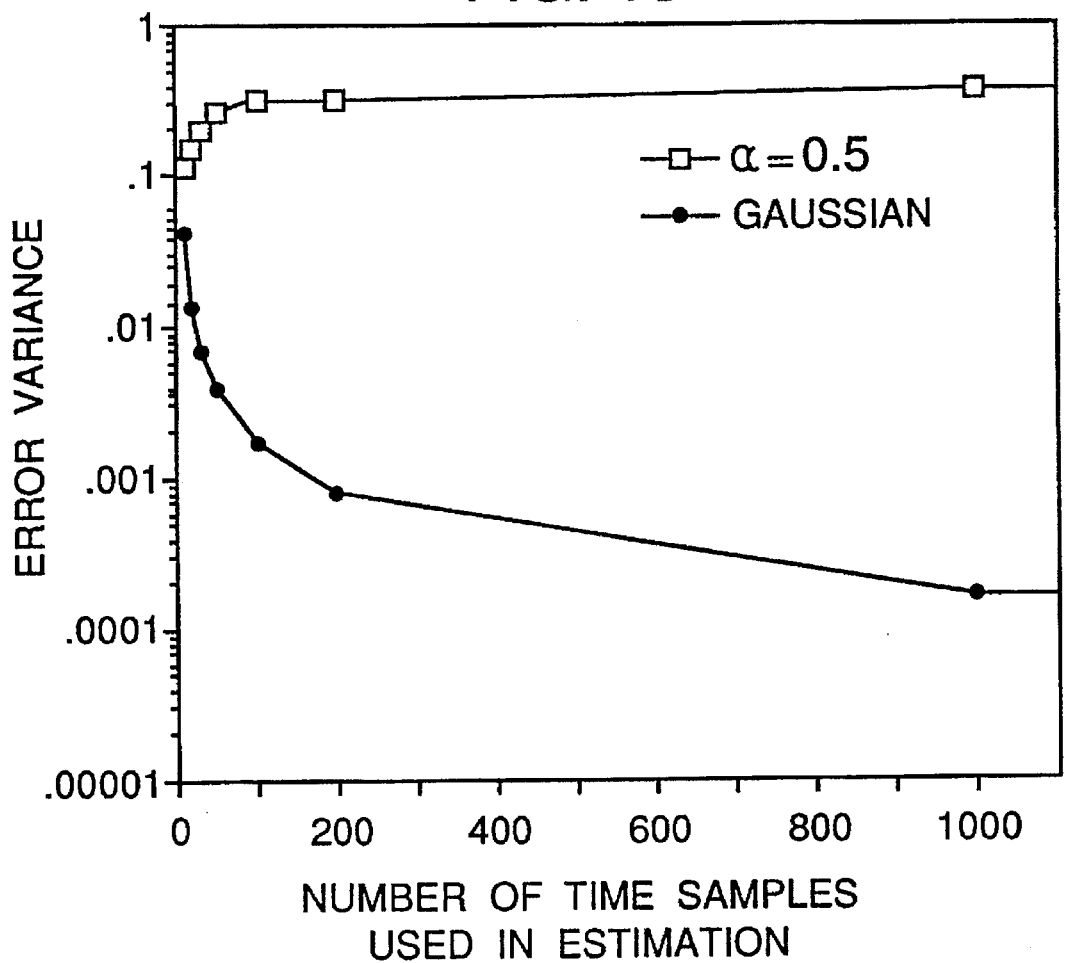

MULTICHANNEL NON-GAUSSIAN RECEIVER AND METHOD

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to multichannel receivers, and more specifically the invention pertains to a system and a process for improving the detection of signals in additive correlated non-Gaussian noise using multichannel data. This invention improves detection performance of receivers through the signal processing architecture and computational procedures.

In airborne radar applications using the conventional Gaussian receiver, distinct thresholds must be established for individual range-azimuth cells over the entire radar surveillance volume. This is due to the fact that the data is observed to be Gaussian only for these individual cells. This procedure is sub-optimal and can result in severe performance losses.

The task of improving the performance of Gaussian receivers is alleviated, to some extent, by the systems described in the following U.S. patents, the disclosures of which are incorporated herein by reference:

U.S. Pat. No. 5,272,698 issued to Champion;

U.S. Pat. No. 5,168,215 issued to Puzzo, and

U.S. Pat. No. 4,855,932 issued to Cangiani.

The patent to Cangiani et al discloses a three dimensional electro-optical tracker with a Kalman filter in which the target is modeled as the superposition of two Gaussian ellipsoids in space and projected onto an image plane. The Puzzo patent is of similar interest. The Champion patent is for a digital communication system.

While the above-cited references are instructive, a need remains for a process for improving the detection of signals in additive correlated non-Gaussian noise multichannel data. The present amendment is intended to satisfy that need.

SUMMARY OF THE INVENTION

The present invention is a multichannel non-Gaussian receiver and process for improving the detection of signals with correlated non-Gaussian noise using multichannel data. This invention improves detection performance of receivers through the signal processing architecture and computational procedures. Several important features of this invention are: the system has the capability of processing both single as well as multiple channel data; the detection architecture is canonical i.e. the architecture circuitry does not change when the statistics of the input data processes change; the minimum mean square error (MMSE) parameter estimators used in this scheme are linear, although the input data processes are non-Gaussian; and the implementation procedure described here for the K receiver provides robust performance for a wide range of non-Gaussian noise phenomena as well as Gaussian noise.

One embodiment of the invention is a multichannel, non-Gaussian receiver for use with a host system that receives an input of obscured data signals. This "host system" can be a radar system, a communication system or an electro-optical detector that is designed to process a signal of interest that may be obscured by Gaussian noise and non-Gaussian noise in the obscured data signals. The invention will process the observed data along with a signal vector (in the known signal case) or a signal steering vector (in the unknown signal amplitude case) from the host system to produce a detection decision: $H_0$ (when the signal of interest is not present in the observed data and $H_1$ when the signal of interest is present in the observed data) using: two linear prediction error filters, two summing junctions, an estimation unit, two ZMNL units and a threshold generator, as described below.

The first summing junction combines the known (or estimated) signal vector and observed test cell data (data assumed to contain the signal to be detected) from the host system to produce an output signal for the first linear prediction error filter. The estimation unit receives and processes the observed data signal from the host system to output filter weights to both linear prediction error filters using one of several currently available mathematical algorithms. The first and second linear prediction error filters are identical and process all inputs received to produce output signals that are mean squared error estimates of those signals received. The second linear prediction error filter only receives the observed reference cell data (data assumed to contain interference and background noise only) from the host system, and outputs a mean squared error estimate of the observed data signal. Kalman filter technology is well known for minimizing the mean squared error between the desired output and the actual output when the input is a signal contaminated by Gaussian noise. However, tapped delay line and lattice structured prediction error filters can also be utilized. The two ZMNL units are data processor elements that are identical and respectively receive and process the outputs of the first and second linear prediction error filters with zero memory nonlinear transforms (ZMNL) operations using the mathematics described below to produce output signals.

The second summing junction subtracts the output of the second ZMNL unit from the output of the first ZMNL unit to produce an output signal that is processed by the threshold generator to produce the detection signal for the host system using the mathematics described in detail below. The output of the threshold generator is $H_o$ when the signal of interest is not present in the observed data signals, and is $H_1$ when the signal of interest is present in the observed data signals.

It is an object of the present invention to improve the detection of signals of airborne radar systems which currently employ Gaussian receivers.

It is another object of the invention to improve the detection of signals with correlated non-Gaussian noise using multichannel data.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

In FIGS. 6 through 13, we define $\rho_c$ as the one-lag clutter cross-channel correlation parameter and $\lambda_c$ as the one-lag temporal clutter correlation parameter.

FIG. 6 is a chart of the probability of detection versus SNR: known constant signal in white K-distributed SIRP noise; $P_c$(clutter cross-channel correlation), J=2, $N_T$=2, $\rho_c$=0, α=shape parameter, $P_{fa}$=1×10$^{-4}$;

FIG. 7 is a chart of the probability of detection versus SNR: known constant signal in white K-distributed SIRP noise; $P_c$(clutter cross-channel correlation), $N_T$=2, α=0.5, $\rho_c$=0, $P_{fa}$=1×10$^{-4}$;

FIG. 8 is a chart of the probability of detection versus SNR: known constant signal in AR(2) K-distributed SIRP noise; $P_c$(clutter cross-channel correlation), J=2, $N_T$=2, α=0.5, $\lambda_c$=0.7 (both channels); normalized clutter Doppler= 0.5; $P_{fa}$=1×10$^{-4}$;

FIG. 9 is a chart of the probability of detection vs the number of time samples $N_{TC}$ used to estimate AR(2) clutter parameters; shape parameter α; J=2, $N_T$=2, $\lambda_{11}$=$\lambda_{22}$=0.7, $\rho_c$=0, SNR=-10dB, $P_{fa}$=1×10$^{-4}$;

FIG. 10 is a chart of the magnitude of the bias versus the number of time samples $N_{TC}$ used in the time-averaged estimate of $a_{11}(1)$ using K-distributed processes with a shape parameter α=0.5 and Gaussian processes; one-lag temporal correlation parameter $\lambda_{ii}$=0.7;

FIG. 11 is a chart of the error variance versus the number of time samples $N_{TC}$ used in the time-averaged estimate of $a_{11}(1)$ using K-distributed processes with a shape parameter α=0.5 and Gaussian processes; one-lag temporal correlation parameter $\lambda_{ii}$=0.7;

FIG. 13 is a chart of the error variance versus the number of time samples $N_{TC}$ used in the time-averaged estimate of $\Sigma_{11}$ using K-distributed processes with a shape parameter α=0.5 and Gaussian processes; one-lag temporal correlation parameter $\lambda_{ii}$=0.7

DETAILED DESCRIPTION OF THE PREFERRED EMBODIMENT

The present invention is a multichannel non-Gaussian receiver and process for improving the detection of signals imbedded in additive correlated non-Gaussian noise using multichannel data. This invention improves detection performance of receivers for applications such as radar, sonar, biomedical diagnostics, geophysical data processing, etc. where the input data processes contain non-Gaussian noise. This improvement is achieved through the signal processing architecture and computational procedure described here.

Several important features of this invention are: (1) the system has the capability of processing both single as well as multiple channel data (2) the detection architecture is canonical for SIRP's; i.e., the architecture circuitry does not change when the statistics of the input data processes change (3) the minimum mean squared error (MMSE) parameter estimators used in this scheme are linear for the large class of non-Gaussian Spherically Invariant Random Processed (SIRP's) which comprise the noise (4) the implementation procedure described here for the K(α=0.5)-receiver provides robust performance for a wide range of non-Gaussian noise phenomena as well as Gaussian noise.

Figure 1:
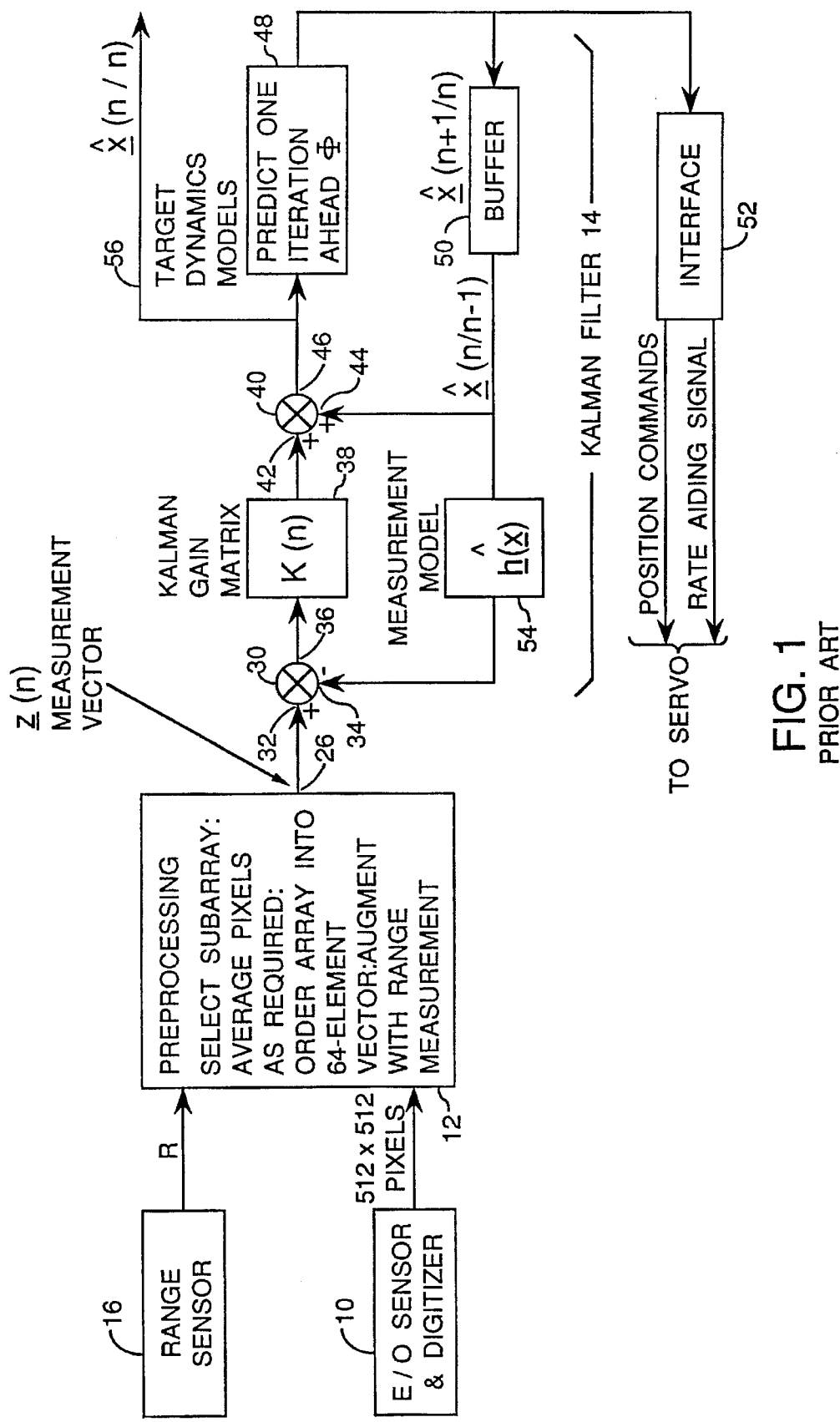
FIG. 1 is an illustration of a prior art electro-optical sensor system which uses a Kalman filter on a detected data stream.

In order to understand the advantages of the present invention, the reader's attention is now directed towards FIG. 1, which is a block diagram of the prior art electro-optical tracker of the above-cited Cangiani et al patent that uses a Kalman filter 14 on the data measurement Z(n) of the sensors 10 and 16. In FIG. 1 the preprocessor 12 averages and orders the image data for the Kalman filter 14. However, there are situations where the image data is unaltered by the preprocessor 12. For example, where the entire image can be encompassed in the 8×8 window, no averaging occurs. The image data is not modified and the preprocessor 12 is in reality a pass-through. Therefore, the Kalman filter 14 in essence receives inputs directly from the electro-optical sensor 10 and the range sensor 16.

The output of the 56 of the Kalman filter 14 is taken from the output 46 of the second adder 40. The signal at that point is designated $\hat{x}$ (n/n). The carat indicates that this quantity is an estimate and the n/n indicates that the estimate is at time nT, given n measurements, where T is the time interval between iterations. The target dynamics model 40, using standard, well-known Kalman techniques, computes the predicted state estimate for time (n+1)T, which is designated $\hat{x}$ (n+1/n). The measurement model 54 processes the predicted state vector estimate from the result of the previous iteration, $\hat{x}$ (n/n−1), which was stored in the buffer 50, generating $\underline{h}$ ($\hat{x}$ (n/n−1)), the estimate of the current measurement. This is subtracted from the measurement vector $\underline{z}$(n) in the first adder 30, yielding the residual or innovations process, $\underline{z}$(n)−h($\hat{x}$ (n/n−1)). The residual is then multiplied by the Kalman gain matrix, K(n), and the result is used to update the state vector estimate, $\hat{x}$ (n).

In each iteration, the state vector $\underline{x}$ is updated to an approximation of the actual position, velocity, and acceleration of the target.

Figure 2:
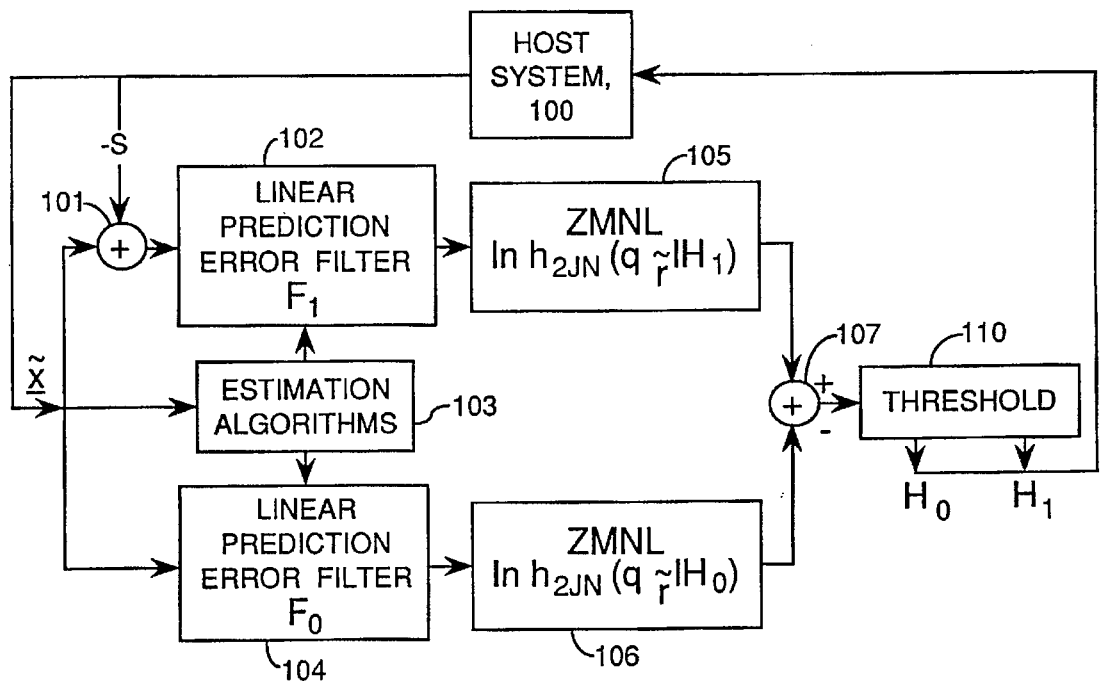
FIG. 2 is a block diagram of the detection architecture of the present invention applied to a known constant signal case.

FIG. 2 is a block diagram of an embodiment of the invention which is a multichannel, non-Gaussian receiver for use with a host system 100 that receives an input of observed data signals. This "host system" 100 can be a radar system, a communication system or an electro-optical detector that is designed to process observed data which may contain a signal of interest in the presence of additive Gaussian noise or non-Gaussian noise. The invention will process the observed data along with a signal vector (in the known signal case) or a signal steering vector (in the unknown signal amplitude case) from the host system to produce a detection decision $H_o$ (when the signal of interest is not present in the observed data); or $H_1$ (when the signal of interest is present in the observed data) using: two linear prediction error filters 102 and 104, two summing junctions 101 and 107, an estimation unit 103, two zero memory non-linear (ZMNL) units 105 and 106, and a threshold generator 110, as described below.

The first summing junction 101 subtracts the signal vector from the observed data signal from the host system to produce an output signal for the first linear prediction error filter 102. The estimation unit 103 receives and processes the observed data signal from the host system 100 to output estimated filter weights to both linear prediction error filters 102 and 104, using the mathematical algorithms described in detail below. The first and second linear prediction error filters 102 and 104 are identical for the case of deterministic (non-random) signals and process all inputs received to produce output signals that are mean squared error estimates of those signals received. The second linear prediction error filter 104 only receives the observed data signals from the host system 100, and outputs a mean squared error estimate of the observed data signal. Kalman filter technology is well known for minimizing the mean squared error between the desired output and the actual output when the input is a signal contaminated by Gaussian noise. The two ZMNL units 105 and 106 are data processor elements that are identical and respectively receive and process the outputs of the first and second linear prediction error filters 102 and 104 with zero memory nonlinear (ZMNL) operations using the mathematics described below to produce output signals.

The second summing junction 107 subtracts the output of the second ZMNL unit 106 from the output of the first ZMNL unit 105 to produce an output called a test statistic that is processed by the threshold generator 110 to produce a decision regarding the presence or absence of the signal for the host system 100 using the mathematics described in detail below. The output of the threshold generator 110 is $H_O$ when the signal of interest is not present in the observed data signals, and is $H_1$ when the signal of interest is present in the observed data signals.

As mentioned above, in sensor applications using the conventional Gaussian receiver, distinct thresholds must be established for individual range-azimuth cells over the entire radar surveillance volume. This is due to the fact that the data is observed to be Gaussian only for these individual cells. This procedure is sub-optimal and can result in severe performance losses. The method proposed here enables the selection of a single threshold to achieve a desired false alarm level over a large region of the surveillance volume, resulting in near optimum performance, and is shown to be considerably robust over a wide range of variations in the statistics of the input data. It is this latter feature which is exploited in this invention; i.e., a specific receiver design can be achieved which provides good performance over a wide range of operational conditions.

Figure 3:
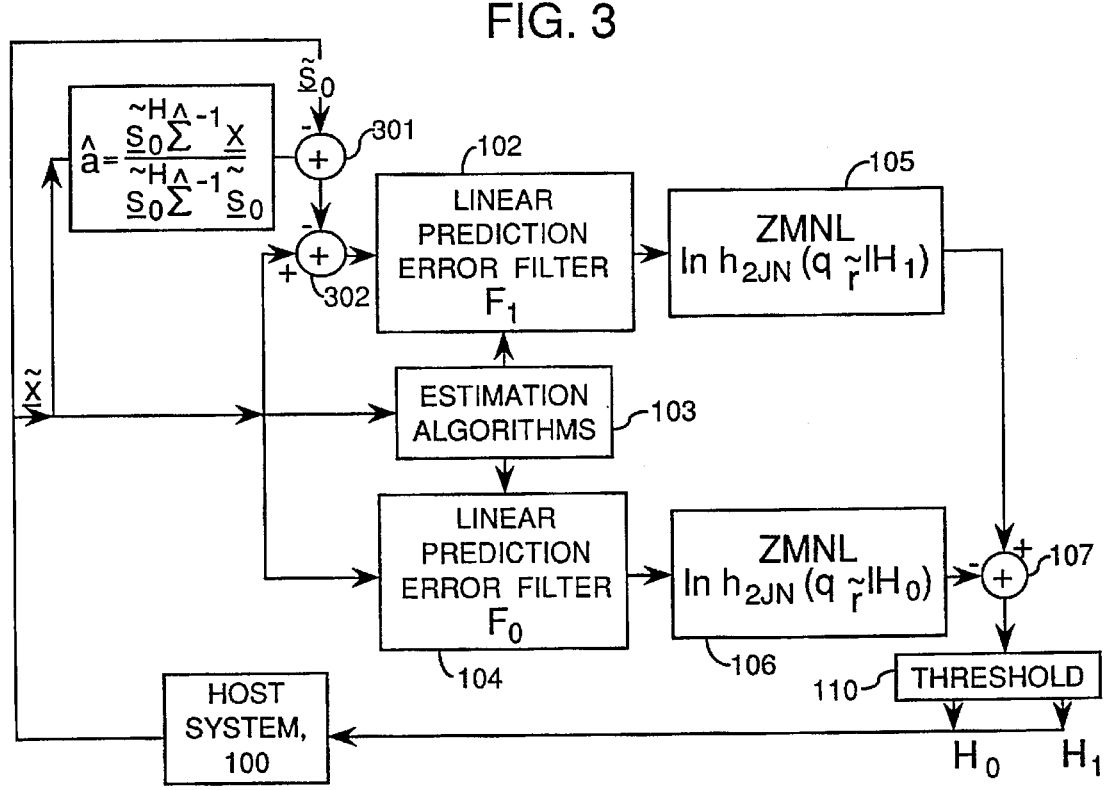
FIG. 3 is a block diagram of the detection architecture of the present invention for the constant signal with unknown amplitude.

The mathematical description of the detection method is presented below. In FIG. 2 we show the diagram of the detection architecture for the case of a known constant J×1 signal vector $\underline{s}$. The detection architecture for the case of a deterministic signal with unknown amplitude is shown in FIG. 3.

In each of these detection schemes, the linear prediction-error filters $F_0$ and $F_1$ provide a multichannel innovations process at the output. These processes are whitened error residuals resulting from a one-step minimum mean squared error estimate $\hat{X}(n)$ of the observation process $\underline{X}(n)$. Furthermore, they are known to contain all the statistical information contained in the input observation data $\underline{X}(n)$ in a compact form. Thus, they can be used to determine a sufficient statistic for detection applications. Since the signals to be detected are considered to be deterministic in this procedure, only the noise interference is considered to be random. In this case, the linear prediction-error filters $F_0$ and $F_1$ are identical. As a consequence, both filter coefficients are estimated from the secondary interference data sources; i.e., data collected on the interference alone using what are called "reference cell" data. Various multichannel signal processing algorithms methods featuring modern parameter estimation methods may be used to estimate the interference depending upon the assumed interference model. These include the Strand-Nuttall algorithm, the Vieira-Morf method, the multichannel Yule-Walker equations, a multichannel Kalman filter estimator, tapped delay line filters and lattice filters all of which are conventional elements and which are known in the art, and which are applied as described below.

The present invention may be defined as both a system and a process which work with a host system to provide an indicator of conditions where: no signal is present in the data; and conditions where signals are present in the data. The host system 100 of FIGS. 2 and 3 may be the electro-optical tracker of FIG. 1, a radar system, or a digital data communication system of the above-cited Champion patent. The present invention receives two signals from the host system: $\underline{X}$ and $-\underline{S}$ (known signal) or $\underline{S}_o$ (signal steering vector) and returns $H_o$ or $H_1$ as described below. This invention can be implemented in either hard wire circuit elements for the blocks of FIGS. 2 and 3, or else as one or more central computers which performs the functions of the blocks in the diagrams.

For the known signal detection procedure shown in FIG. 2, the observation data $\underline{X}(n)$ is first split into an upper and lower path. In the upper path, the known signal is first subtracted from the data and then passed to the linear prediction error filter. In the lower path, it is passed directly to the prediction error filter. For the case of the signal with unknown amplitude shown in FIG. 3, the signal amplitude estimate a is first obtained using $$\hat{a} = \frac{\underline{S}_0^H \Sigma^{-1} \underline{\tilde{X}}}{\underline{S}_0^H \Sigma^{-1} \underline{S}_0}$$

where $\underline{S}_o$ is the steering vector and $\hat{\Sigma}^{-1}$ is the inverse of the estimated data covariance matrix. We then obtain $\underline{\hat{S}} = \hat{a}\underline{s}_o$ at the output of the multiplier shown in FIG. 3. This signal estimate is then subtracted from the input observation data $\underline{X}(n)$ in the upper path and the resulting process is passed to the prediction error filter, $F_1$. As in the previous diagram, the observation vector in the lower path is passed directly to the prediction error filter $F_0$.

In both schemes, the resulting innovations processes obtained at the output of the prediction error filters are then input to the zero-mean non-linear processor. The estimated innovations processes $\Gamma(k)$ and their associated estimated variances $\sigma_j^2(k)$ are used to compute $q_x|H_i$ using $$q_x \bigg| H_j = \sum_{j=1}^{J} \sum_{k=1}^{N} \frac{|\tilde{\Gamma}(k|H_i)|^2}{\sigma_j^2(k|H_i)} = q_{\tilde{T}} \bigg| H_i \, i = 0, 1$$

where $H_0$ denotes the condition where no signal is present in the data and $H_1$ denotes the signal present case. The innovations processes $\Gamma(k|H_0)$ and $\Gamma(k|H_1)$ are obtained at the outputs of filters $F_0$ and $F_1$, respectively. The quantities $q_T|H_i, i=0,1$ are now processed using the function $h_{2JN}(q_T|H_i)$ which is a monotonically decreasing function of the argument for all JN. For the case of K-distributed SIRV's $h_{2JN}(q_T|H_i)$ is computed as described below.

The K($\alpha$=0.5)-receiver could also be implemented with other values of $\alpha$ in order to match the statistics of the observation data processes. This invention solves the problem of multichannel signal detection in additive correlated non-Gaussian noise using a new approach. While this problem has been addressed extensively for the case of additive Gaussian noise, the corresponding problem for the non-Gaussian case has received limited attention. This is due to the fact that there is no unique specification for the joint probability density function (PDF) of N correlated non-Gaussian random variables. We overcome this problem by using the theory of spherically invariant random processes (SIRP) and derive the innovations based detectors. It is found that the optimal estimators for obtaining the innovations processes are linear and that the resulting detector is canonical for the class of PDFs arising from SIRPs. SIRPs are generalizations of the familiar Gaussian random process in that the PDF of every random vector obtained by sampling a SIRP is uniquely determined by the specification of a mean vector, a co-variance matrix and a characteristic first order PDF. In addition, the PDF of a random vector obtained by sampling an SIRP is a monotonically decreasing function of a non-negative quadratic form. However, the PDF does not necessarily involve an exponential dependence on the quadratic form, as in the Gaussian case. Many of the attractive properties of the Gaussian random process also apply to SIRPs. Every random vector obtained by sampling an SIRP is a spherically invariant random vector (SIRV).

Model-based parametric approaches for detection of time-correlated signals in non-white Gaussian noise for radar applications have received considerable attention. An important feature of the model-based methods is their ability to utilize modern parameter estimators in the signal processing. In this scheme, random processes are whitened through a casual transformation of the observed data using prediction error filters. The resulting uncorrelated error processes are the innovations and contain in a compact form all the useful information about the processes. The innovations are useful for obtaining a sufficient statistic in hypothesis testing for the presence or absence of a desired signal. Extension of these techniques for the multichannel problem using Gaussian noise has been considered.

In this invention we present an innovations based detection algorithm (IBDA) for multichannel signal detection in additive correlated non-Gaussian noise under the assumption that the noise process can be modeled as an SIRP. Preliminary results of our investigation for the single channel case are discussed below. In particular, it is shown that the optimal estimator for obtaining the innovations process for SIRPs is linear and that the resulting detector has a canonical form. The detection architecture consists of a linear prediction filter followed by a memoryless nonlinear transformation. Previous work dealing with non-Gaussian processes has indicated that the innovations processes are obtained by using nonlinear prediction error filters. The resulting detection scheme is sub-optimal because the nonlinearity is not reversible. On the other hand, our work dealing with non-Gaussian random processes that can be modeled as SIRPs reveals that the optimal filter for obtaining the innovations process is linear. In addition, the IBDA developed in this invention is optimal. Thus, the work of this invention generalizes work in the area of signal detection in non-Gaussian noise processes.

In order to understand this invention, please consider the following definitions and relevant mathematical preliminaries for complex-SIRVs and complex-SIRPs. A random vector $Y=Y_c+jY_s$, where $Y_c=[Y_{c1}, Y_{c2}, \ldots, Y_{cN}]^T$ and $Y_s=[Y_{s1}, Y_{s2}, \ldots, Y_{sN}]^T$ denote the vectors of the in-phase and out-of-phase quadrature components is a complex-SIRV if its PDF has the form $$f_{\tilde{Y}}(\tilde{y}) = (\pi)^{-N}|\tilde{\Sigma}|^{-1} h_{2N}(p) \tag{1}$$

where $p=\tilde{y}^H \tilde{\Sigma}^{-1} \tilde{y}$, $\tilde{\Sigma}$ is a non-negative definite Hermitian matrix, and $h_{2N}(.)$ is a positive, real valued, monotonically decreasing function for all N. If every random vector obtained by sampling a complex random process, $\tilde{y}(t)$, is a complex-SIRV, regardless of the sampling instants or the number of samples, then the process $\tilde{y}(t)$ is defined to be a complex SIRP.

The work of Yao gave rise to the representation theorem for real SIRVs. The representation theorem generalizes the complex-SIRVs readily and is stated as follows:

Theorem 1 a random vector Y is a complex-SIRV if and only if it is equivalent to the product of a complex-Gaussian random vector Z and a random variable V with PDF $f_v(v)$.

The above theorem can be proved in a straightforward manner. For convenience of analysis, it is assumed that V is a non-negative random variable and is statistically independent of Z. Furthermore, it is assumed without loss of generality that $E(V^2)=1$ so that the covariance matrix of the complex-SIRV, $\tilde{\Sigma}$, is equal to the covariance matrix of the complex-Gaussian random vector. The PDF of the random variable V, $f_v(v)$, is defined to be the characteristic PDF of the complex-SIRV.

Thus, the representation theorem allows us to express a complex-SIRV, $\tilde{Y}$, as $$\tilde{Y}=\tilde{Z}V \tag{2}$$

where $\tilde{Z}$ is a zero-mean complex-Gaussian random vector having covariance matrix $\tilde{\Sigma}$ and V is the previously defined non-negative random variable. The PDF of $\tilde{Y}$ can be expressed as $$f_{\tilde{Y}}(\tilde{y}) = \int_0^\infty f_{\tilde{Y}|v}(\tilde{y}|v) f_V(v) dv \tag{3}$$

where $$f_{\tilde{Y}|v}(\tilde{y}|v) = \pi^{-N}|\tilde{\Sigma}|^{-1} v^{-2N} \exp\left(-\frac{p}{v^2}\right). \tag{4}$$

We can rewrite eq (3) as $$f_{\tilde{Y}}(\tilde{y}) = (\pi)^{-N}|\tilde{\Sigma}|^{-1} h_{2N(p)} \tag{5}$$

where $$h_{2N(p)} = \int_0^\infty v^{-2N} \exp\left(-\frac{p}{v^2}\right) f_V(v) dv. \tag{6}$$

We then consider the real random vector $Y=[Y_c^T Y_s^T]^T$. Let $\Sigma$ denote the covariance matrix of Y. $\Sigma$ can be partitioned as $$\Sigma = \begin{bmatrix} \Sigma_{cc} & \Sigma_{cs} \\ \Sigma_{sc} & \Sigma_{ss} \end{bmatrix} \tag{7}$$

where $$\Sigma_{cc} = E\{Y_c Y_c^T\} \quad \Sigma_{ss} = E\{Y_s Y_s^T\} \\ \Sigma_{cs} = E\{Y_c Y_s^T\} \quad \Sigma_{sc} = E\{Y_s Y_c^T\}. \tag{8}$$

The representation theorem and the assumption that $E(V^2)=1$, give rise to the following necessary and sufficient conditions for representing $\tilde{Y}$ as a complex-SIRV $$E\{Y_c\} = E\{Y_s\} = 0 \tag{9}$$

-continued $$\Sigma_{cc} = \Sigma_{ss}$$
$$\Sigma_{cs} = -\Sigma_{sc}.$$

Under these conditions, it follows that $$\Sigma=2[\Sigma_{cc}+j\Sigma_{sc}]. \quad (10)$$

Several attractive properties of complex-Gaussian random vectors generalize to complex-SIRVs as a consequence of the representation theorem. The most relevant property of complex-SIRVs for this paper is the linearity of estimators in minimum mean square error estimation (MMSE) problems. This property is discussed in detail below.

In minimum mean square error estimation (MMSE) problems, given a set of data, real SIRVs are found to result in linear estimators. This property is readily extended to complex-SIRVs in this section. Let $Y=[Y_1^T Y_2^T]^T$ where $Y_1=[Y_1, Y_2, \ldots Y]$ and $Y_2=[Y_{m+1}, Y_{m+2}, \ldots Y_N]^T$ denote the partitions of $\tilde{Y}$. Note that $Yi=Yci+jYsi$, $i=1,2,\ldots,N$. It has been pointed out that the minimum mean square error estimate of the random vector $\tilde{Y}_2$ given the observations from the random vector $\tilde{Y}_1$, is $$\hat{\tilde{Y}}_2 = E[\tilde{Y}_2|\tilde{Y}_1] \quad (11)$$

where $E[\tilde{Y}_2|\tilde{Y}_1]$ denotes the conditional mean or the expected value of $\tilde{Y}_2$ given $\tilde{Y}_1$. We prove that $E[\tilde{Y}_2|\tilde{Y}_1]$ is a linear function of $\tilde{Y}_1$ under the assumption that Y is a complex-SIRV.

Since $\tilde{Y}$ is a complex-SIRV, it follows that the PDF of Y is of the form of eq (3) with $h_{2N(p)}$ being given by eq (6). For convenience, we partition the covariance matrix $\Sigma$ as $$\tilde{\Sigma} = \begin{bmatrix} C_{11} & C_{12} \\ C_{21} & C_{22} \end{bmatrix} \quad (12)$$

where $C_{11}$ denotes the covariance matrix of $Y_1$, $C_{12}$ denotes the cross covariance matrix of the vectors $Y_1$ and $Y_2$, $C_{21}$ is the Hermitian transpose of $C_{12}$, and $C_{22}$ denotes the covariance matrix of the vector $Y_2$. As a consequence of the representation theorem for complex-SIRVs, it follows that $Y_1$ and $Y_2$ are jointly complex-Gaussian conditional on the random variable V. In particular, the joint PDF of $Y_1$ and $Y_2$ conditioned on V is given by eq (4). We can then express $E[\tilde{Y}_2|\tilde{Y}_1]$ as $$E[\tilde{Y}_2|\tilde{Y}_1] = E_V[E[(\tilde{Y}_2|\tilde{Y}_1)|V]] \quad (13)$$

where $E_V$ denotes the expectation over the random variable V. Since $\tilde{Y}_1$ and $\tilde{Y}_2$ are jointly complex-Gaussian, it follows that:

$$E[(\tilde{Y}_2|\tilde{Y}_1)|V] = [v^2 C_{21} v^{-2} C_{11}^{-1} \tilde{y}_1] = [C_{21} C_{11}^{-1} \tilde{y}_1]. \quad (14)$$

Therefore, $$E[\tilde{Y}_2|\tilde{Y}_1 = \tilde{y}_1] = \int_0^\infty [C_{21} C_{11}^{-1} \tilde{y}_1] f_V(v) dv = [C_{21} C_{11}^{-1} \tilde{y}_1]. \quad (15)$$

Hence, it follows that $$\hat{\tilde{Y}}_2 = [C_{21} C_{11}^{-1} \tilde{y}_1]. \quad (16)$$

It is seen that the MMSE estimate of $Y_2$ given the data $Y_1$ is a linear function of $Y_1$.

We assume that the complex-SIRV Y is obtained by sampling a complex-SIRP y(k) at different time instants. Thus for a given k, y(k) is a complex random variable. The complex innovations sequence is defined as $$\epsilon(k) = \tilde{y}(k) - \hat{\tilde{y}}(k) \quad (17)$$

where $\hat{\tilde{y}}(k)$ is the MMSE of $\tilde{y}(k)$ given the observations $\tilde{y}(m)$, $m=1,2,\ldots k-1$. Since $\tilde{y}(k)$ is a complex-SIRP, it follows that $\hat{\tilde{y}}(k)$ can be obtained by using eq (16). Consequently, it is necessary to specify $C_{21}$ and $C_{11}^{-1}$ for obtaining $\hat{\tilde{y}}(k)$. This is achieved by the use of a linear prediction error filter whose coefficients are chosen so as to be equivalent to eq (16). In particular, we could use a complex autoregressive process of order two AR(2) process] for approximating the complex-SIRP. The complex innovations process of eq (17) has zero mean, is uncorrelated and is a complex-SIRP having the same characteristic PDF as $\tilde{y}(k)$.

The problem of obtaining the single channel innovations sequence for correlated non-Gaussian processes has also been considered previously. This approach involved zero memory nonlinear(ZMNL) transformations which transformed the processes from non-Gaussian to Gaussian. This was followed by a linear prediction filter and another zero memory nonlinear transformation which gave rise to the innovations process. This approach has the following drawbacks.

1. The correlation function at the output of the ZMNL transformation is related in a rather complicated manner to the correlation function at the input.
2. The correlation function at the output of the ZMNL transformation is not guaranteed to be non-negative definite.
3. If the process at the input of the ZMNL transformation is bandlimited, then the process at the output is also bandlimited if and only if the nonlinearity is a polynomial.

Therefore, the approach using nonlinear transformations to obtain the innovations process is sub-optimal. However, for non-Gaussian complex-SIRPs, we have shown that the linear prediction filter is optimal for obtaining the innovations sequence. The complex innovations sequence obtained in this section is used for developing the detection procedure discussed below.

We concern ourselves with the multichannel innovations based detection algorithm (IBDA) for SIRPs in this discussion. The problem of signal detection using multichannel observations is important in radar, sonar, digital communications, biomedical applications and remote sensing. In particular, we consider the binary multichannel detection problem for a known (non-random) signal in an additive SIRP interference. The interference is allowed to be correlated within a given channel as well as across channels. We present a model-based approach for this problem and show that the resulting receiver has a canonical form. The underlying interference process is assumed to be characterized by a multichannel autoregressive (AR) process. The detection procedure implements a likelihood ratio which is sensitive to the differences between the estimated model parameters under each hypothesis. Thus, the model-based approach is based on the contention that the coefficients of the received process are distinct for each of the two hypothesis. The innovations process arises naturally in this procedure.

We consider the following multichannel detection problem and derive the relevant likelihood ratio by two different methods. Consider the two hypotheses $$H_0: \tilde{x}(k) = \tilde{y}(k) \quad k = 1, 2, \ldots N \tag{18}$$

$$H_1: \tilde{x}(k) = \tilde{s}(k) + \tilde{y}(k) \quad k = 1, 2, \ldots N$$

where $H_0$ and $H_1$ denote the alternate hypothesis when the signal is absent and present, respectively, $\tilde{x}(k)$ is the $j \times 1$ complex observation data vector, $\tilde{y}(k)$ is a zero-mean complex-SIRP, $\tilde{s}(k)$ is a known $J \times 1$ constant complex signal and J denotes the number of channels.

We first express the likelihood ratio for the multivariate SIRV PDFs as $$\Lambda\{\tilde{x}\} = \frac{f_{\tilde{x}H_1}(\tilde{x}|H_1)}{f_{\tilde{x}H_0}(\tilde{x}|H_0)} \tag{19}$$

where $\tilde{x} = [\tilde{x}(1)^T, \tilde{x}(2)^T, \ldots \tilde{x}(N)^T]^T$. From the complex-SIRV PDF of eq (1), it follows that $$f_{\tilde{x}H_i}(\tilde{x}|H_i) = \pi^{-JN} |\Sigma_{JN,H_i}|^{-1} h_{2JN}(q_{\tilde{x}}|H_i) \quad i=0,1 \tag{20}$$

where $q_{\tilde{x}} = x^H(\Sigma_{JN,H_i})^{-1} x, \Sigma_{JN,H_i}$ is the $JN \times JN$ covariance matrix of the observed process x under the hypothesis $H_i$ and $h_{2JN}(\cdot)$ is a positive, real valued, monotonically decreasing function for all N and J and $h_{2JN}(\cdot)$ is obtained by using eq (6). Considering $LDL^H$ decomposition of $\Sigma_{JN,H_i}$, it can be readily shown that $$\Sigma_{JN,H_i}^{-1} = [L_{\beta,H_i}^H]^{-1} D_{\beta,H_i}^{-1}(L_{\beta,H_i})^{-1} \tag{21}$$

$$|\Sigma_{JN,H_i}| = |L_{\beta,H_i}||D_{\beta,H_i}||L_{\beta,H_i}^H| = |D_{\beta,H_i}|$$

where $^D\beta H_i$ is a diagonal matrix. Since $\Sigma_{JN,H_i} = L_{\beta,H_i} D_{\beta,H_i} L_{\beta,H_i}^H$, it follows that $$D_{\beta,H_i} = E[\tilde{\beta}\tilde{\beta}^H] \tag{22}$$

where $\beta = L_\beta H_i^{-1} x$. Consequently, $$\begin{aligned} q_{\tilde{x}}|H_i &= \tilde{x}^H (\Sigma_{JN,H_i})^{-1} \tilde{x} \tag{23} \\ &= [L_{\beta,H_i}\tilde{\beta}]^H [L_{\beta,H_i}^H]^{-1}(D_{\beta,H_i})^{-1} L_{\beta,H_i}^{-1}[L_{\beta,H_i}\tilde{\beta}] \\ &= \tilde{\beta}^H (D_{\beta,H_i})^{-1} \tilde{\beta} \\ &= \sum_{j=1}^{J}\sum_{n=1}^{N} \frac{|\tilde{\beta}|^2}{\sigma_{jn}^2}(H_i) \\ &= q_{\tilde{\beta}}|H_i \end{aligned}$$

where $\sigma^2_{jn}$ is the $jn^{th}$ diagonal component of $^D\beta H_i$. The vector $\beta$ is the multichannel complex innovations process. Thus, a block form of a statistically equivalent innovations based likelihood ratio can be written as $$\Lambda\{\tilde{\beta}\} = \frac{f_{\tilde{\beta}H_1}(\tilde{\beta}|H_1)}{f_{\tilde{\beta}H_0}(\tilde{\beta}|H_0)} = \frac{|D_{\tilde{\beta},H_1}|^{-1} h_{2JN}(q_{\tilde{\beta}}|H_1)}{|D_{\tilde{\beta},H_0}|^{-1} h_{2JN}(q_{\tilde{\beta}}|H_0)} \tag{24}$$

Taking the natural logarithm of (24), we obtain $$\ln[\Lambda\{\tilde{\beta}\}] = \left\{ \sum_{j=1}^{J}\sum_{n=1}^{N} \ln[\sigma_{jn}^2(H_0)] - \ln[\sigma_{jn}^2(H_1)] \right\} + \tag{25}$$

$$\ln[h_{2JN}(q_{\tilde{\beta}}|H_1)] - \ln[h_{2JN}(q_{\tilde{\beta}}|H_0)]$$

Although eq (16) for the MMSE estimate of $Y_2$ is independent of the type of SIRP, observe that the test statistic of eq (25) involves a nonlinearity $h_{2JN}(\cdot)$ which does depend on the type of SIRP.

In order to obtain the sequential form of the multichannel likelihood ratio, we make use of the representation theorem.

We start with the PDF of eq (20). Due to the representation theorem for complex-SIRVs, we can express the PDF of eq (20) as $$f_{\tilde{x}H_i}(\tilde{x}|H_i) = \int_0^\infty f_{\tilde{x}H_i,v}(\tilde{x}|H_i,v) f_V(v) dv \tag{26}$$

where $$f_{\tilde{x}H_i,v}(\tilde{x}|H_i,v) = \pi^{-JN} |\Sigma_{JN,H_i}|^{-1} v^{-2JN} \exp\left[ -\frac{q_{\tilde{x}}|H_i}{v^2} \right] \tag{27}$$

The PDF of eq (27) can be expressed as $$f_{\tilde{x}H_i,v}(\tilde{x}|H_i,v) = \tag{28}$$

$$f_{\tilde{x}(l)H_i,v}(\tilde{x}(l)|H_i,v) \prod_{k=2}^{N} f_{\tilde{x}(k)H_i,\tilde{x}(k-1),v}[\tilde{x}(k)|H_i,\tilde{x}(k-1),v]$$

Since the conditional PDF of eq (27) is a complex-Gaussian PDF, it follows that the conditional PDFs $$f_{\tilde{x}(k)H_i, \tilde{x}(k-1)}[\tilde{x}(k)|H_i, \tilde{x}(k-1),\tilde{x}(k-2), \ldots, \tilde{x}(1),v], \ldots, x(1), v],$$

$k=2,3, \ldots, N$ are also complex-Gaussian. Therefore, all that is needed to determine the PDFs $$f_{\tilde{x}(k)H_i, \tilde{x}(k-1)\tilde{x}(k-2),\ldots\tilde{x}(1),v}[\tilde{x}(k)|H_i, \tilde{x}(k-1),\tilde{x}(k-2), \ldots, \tilde{x}(1),v],$$

$k=2,3 \ldots, N$ is the specification of their conditional means and conditional covariance matrices. In particular, we need to specify $$\overset{\wedge}{\tilde{X}}(k) = E[\tilde{X}(k)|H_i, \tilde{X}(k-1), \tilde{X}(k-2), \ldots, \tilde{X}(l), V] \tag{29}$$

$$\Sigma_{kk-1,V} = E[\{\tilde{X}(k) - \overset{\wedge}{\tilde{X}}(k)\}\{\tilde{X}(k) - \overset{\wedge}{\tilde{X}}(k)\}^H].$$

Let $$\tilde{\phi}(k) = [\{\tilde{X}(k) - \overset{\wedge}{\tilde{X}}(k)\}]H_i, V$$

$$M_{kk-1,H_i,V} = E[\tilde{\phi}(k)\tilde{\phi}^H(k)].$$

A further $LDL^H$ decomposition of $M_{kk-1,H_i,V}$ results in the quadratic form $q_{\tilde{x}}|H_i$ being expressed as $$q_{\tilde{x}}|H_i = \sum_{j=1}^{J}\sum_{n=1}^{N} \frac{|\tilde{\Gamma}|^2}{\sigma_{jn}^2}(H_i) = q_{\tilde{\Gamma}}|H_i \tag{31}$$

where $\Gamma(k)$ is the complex zero mean, uncorrelated innovations vector having a diagonal covariance matrix $D_\Gamma$, $H_i$ and $\sigma_{jn}$ is the $jn^{th}$ diagonal component $D_\Gamma$, $H_i$. Therefore it follows that $$f_{\tilde{x}H_i,v}(\tilde{x}|H_i,v) = \pi^{-N}|D_{\Gamma,H_i}|^{-1} v^{-2JN} \exp\left[ -\frac{q_{\tilde{\Gamma}}|H_i}{v^2} \right] \tag{32}$$

where $q_\Gamma |H_i$ is defined in eq (31). Using eq (32) in eq (26), and recognizing that the resulting integral is of the form of eq (6), it follows that the PDF of eq (26) can be expressed in terms of the corresponding multichannel innovations process. The likelihood ratio of the form of eq (25) follows using the approach of this invention. Thus we have shown that the block form and sequential form of the innovations-based likelihood ratio are equivalent. We use the sequential approach for ease of implementation. The implementation of the linear prediction filter for obtaining the multichannel innovations process is discussed below.

The detection procedure consists of comparing the innovations-based likelihood ratio of eq (25) with a suitable threshold $\eta$ is determined based on a desired false alarm probability. Therefore, the innovations based detection algorithm takes the form $$\ln[\Lambda\{\tilde{\Gamma}\}] \underset{H_0}{\overset{H_1}{\gtrless}} \eta \quad (33)$$

where $$\Lambda\{\tilde{\Gamma}\} = \frac{f_{\tilde{t}W_1}(\tilde{\Gamma}|H_1)}{f_{\tilde{t}W_0}(\tilde{\Gamma}|H_0)} = \frac{|D_{\tilde{t}W_1}|^{-1} h_{2JN}(\tilde{q}_{\tilde{\Gamma}}|H_1)}{|D_{\tilde{t}W_0}|^{-1} h_{2JN}(\tilde{q}_{\tilde{\Gamma}}|H_0)}. \quad (34)$$

The resulting receiver consists of a whitening filter followed by a zero memory nonlinear transformation (ZMNL) under $H_0$ and $H_1$ where the difference is compared to a threshold. The detection architecture is shown in FIG. 2. The detection architecture of FIG. 2 is canonical for all complex-SIRPs.

The innovations-based likelihood ratio enables understanding of the role of the nonlinear transformation in the detection architecture of FIG. 2 and is presented here. Since $h_{2JN}(.)$ is a monotonically decreasing function of the argument for all JN, $h_{2JN}(.)$ decreases as $\tilde{q}_{\tilde{\Gamma}}|H_i$ increases proportionally via eq (33) under the mismatched hypothesis condition. Therefore, the basis of the detection strategy is that under hypothesis $H_0$, the log-likelihood ratio of eq (33) decreases, thus remaining below a fixed threshold. This is due to the fact that $h_{2JN}(\tilde{q}_{\tilde{\Gamma}}|H_1)$ decreases with increasing error signals under the mismatched hypothesis. Conversely, $h_{2JN}(\tilde{q}_{\tilde{\Gamma}}|H_0)$ increases, yielding a larger negative contribution in eq (33). When $H_1$ is true, the respective roles of $h_{2JN}(\tilde{q}_{\tilde{\Gamma}}|H_0)$ and $h_{2JN}(\tilde{q}_{\tilde{\Gamma}}|H_1)$ are reversed, thus causing an increase in the log-likelihood ratio.

We present detection results using the detection architecture of FIG. 2 in this discussion. Performance of the IBDA is determined by using computer simulation for the case of a known (non-random) signal in an additive K-distributed SIRP interference. We consider both the case of an uncorrelated SIRP and an autoregressive SIRP of order two.

The K-distributed envelope PDF, whose quadrature components have a Generalized- LaPlace distribution, is useful for modeling non-Gaussian interference in radar and communications and is given by $$f_R(r) = \frac{2b}{\Gamma(\alpha)} \left(\frac{br}{2}\right)^\alpha K_{\alpha-1}(br) \quad 0 \leq r \leq \infty \quad (35)$$

where $\alpha$ is the shape parameter of the distribution, b denotes the scale parameter of the distribution, and $K_N(t)$ is the $N^{th}$ order modified Bessel function of the second kind. It has been pointed out that the K-distribution is a member of the family of SIRVs. The characteristic PDF for the K-distributed SIRV is $$f_v(v) = \frac{2b}{\Gamma(\alpha)} (bv)^{2\alpha-1} \exp(-b^2 v^2) \quad 0 \leq v \leq \infty. \quad (36)$$

Using eq (6), it follows that the corresponding $h_{2JN}(q)$ for the K-distributed SIRV is $$h_{2JN}(q) = \frac{2b^{2JN}}{\Gamma(\alpha)} (b\sqrt{q})^{\alpha-JN} K_{\alpha-NJ}(2b\sqrt{q}). \quad (37)$$

Details of the Monte-Carlo procedure are known in the art. The input observation data processes are generated using the process synthesis procedure which has been modified to include the SIRP generation procedure. Detection performance results are determined as a function of the channel signal-to-noise (SNR)$_j$ ratios and the temporal and cross-channel correlation of the interference processes.

In several practical applications, 'a priori' information may be available for determining the filter order and coefficients. Specifically, data from a 'reference channel' is used to access the hypothesis $H_0$ condition while data from a 'test channel' is used for that of $H_1$. Under these conditions, the two data sets are used for estimating the filter coefficients, $F_0$ and $F_1$, respectively.

In this paper the filter orders are assumed to be known 'a priori'. However, the prediction error filter coefficients need to be determined. For the case where the interference spectrum is unknown, the filter coefficients are estimated with the Strand-Nuttall algorithm. The Strand-Nuttall algorithm is the multichannel extension of the Burg algorithm. Since this algorithm uses a block of data in the estimation procedure, 'a priori' data consisting on $N_{TC}$ time samples per block are used. In some cases coefficient averaging is performed over $N_{RC}$ statistically independent block realizations collected from reference channel data. In this discussion $N_{RC}=1$. Having estimated the prediction error filter coefficients, the detection results are then computed for $N_T$ time samples per channel using $N_R$ Monte-Carlo realizations.

All the detection results in this paper are computed for a false alarm probability ($P_{fa}$) of $10^{-4}$. For the case where the SIRP is modeled as an AR process of order two, the $F_1$ and $F_0$ filters are also of order two. However, for the case of the white SIRP, filtering is unnecessary since the SIRP is an AR process of order zero. With the filter weights fixed, the detection results were computed via Monte-Carlo simulation using $N_R=100,000$ realizations and $N_T=2$ time samples per channel.

FIGS. 4–7 show the plot of probability of detection ($P_d$) versus signal-to-noise ratio (SNR) for a known deterministic signal in an additive white K-distributed SIRP. Since for this case, the SIRP is known to be white 'a priori' and uncorrelated across channels, the $F_1$ and $F_0$ filters are omitted.

Figure 4:
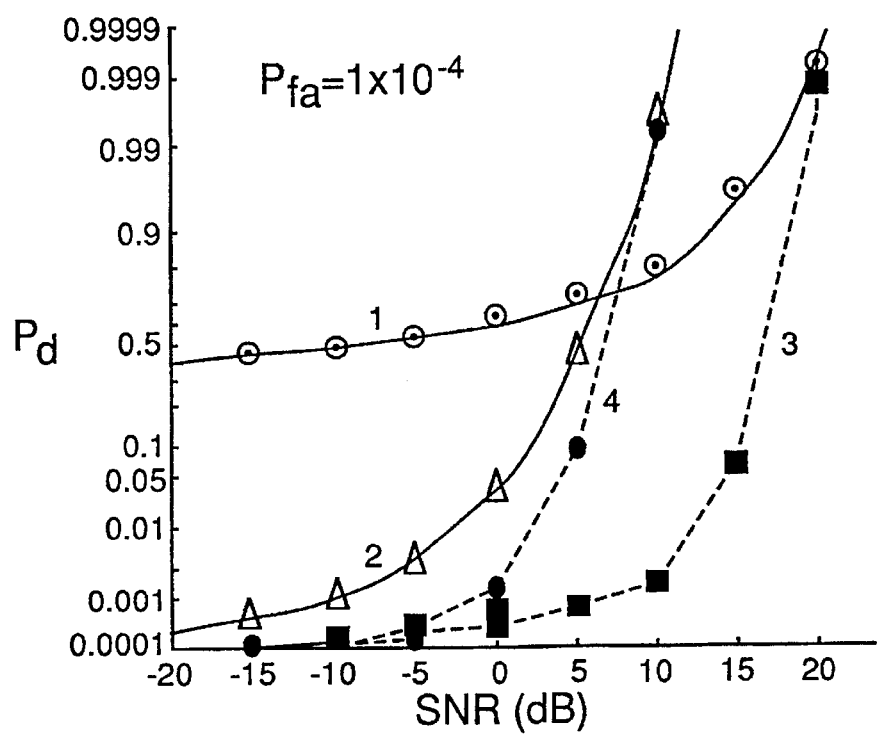
FIG. 4 is a chart of the probability of detection versus SNR: known constant signal in white K-distributed SIRP noise; J=1 channel, $N_T$=2 and α=shape parameter; in curves 1 and 2, the receivers are matched to the α=0.1 and Gaussian noise, respectively; in curve 3 the Gaussian receiver is used in K-distributed noise with α=0.1 in curve 4, a K(α=0.1) receiver is used with Gaussian noise; $P_{fa}$=1×10$^{-4}$.

FIG. 4 shows the detection results for the single channel (J=1) case using $N_T=2$ time samples. Curve 1 describes the case where the white K-distributed SIRP has shape parameter $\alpha=0.1$. Curve 2 corresponds to the case of $\alpha=\infty$, i.e., when the interference is a white Gaussian SIRP. The $h_{2JN}(.)$ for this case is simply $\exp(-q)$. Curve 3 shows the case where a mis-matched receiver is used. More precisely, the interference is a white K-distributed SIRP with $\alpha=0.1$. The receiver used is the receiver corresponding to the white Gaussian SIRP. Finally, curve 4 shows the mismatched case where the receiver designed for the K-distributed SIRP ($\alpha=0.1$) is used to cancel white Gaussian interference.

These curves reveal several important features. First, curves 1 and 2 show the potential for significant performance improvement at low signal-to-noise ratios when dealing with non-Gaussian processes as opposed to Gaussian processes. For example, at SNR ratio of −5 dB, the results for the K-distributed SIRP for $\alpha=0.1$ show performance improvement of more than two orders of magnitude compared to the case of the Gaussian SIRP. Comparison of curves 1 and 3 reveals that there is a significant degradation of performance due to receiver mismatch. Comparison of curves 2 and 4 also shows a degradation in performance of the case where the non-Gaussian receiver is used and the interference is Gaussian. However, the degradation for the latter case is less severe than in the former. Therefore, there is an improvement in performance when the interference is modeled correctly and the receiver matched appropriately to the interference is used; i.e., performance is degraded severely when the Gaussian receiver is used to cancel the non-Gaussian interference. However, we notice that the non-Gaussian receiver shows considerable robustness for shape parameter values in the range $\alpha=0.1-\infty$.

Figure 5:
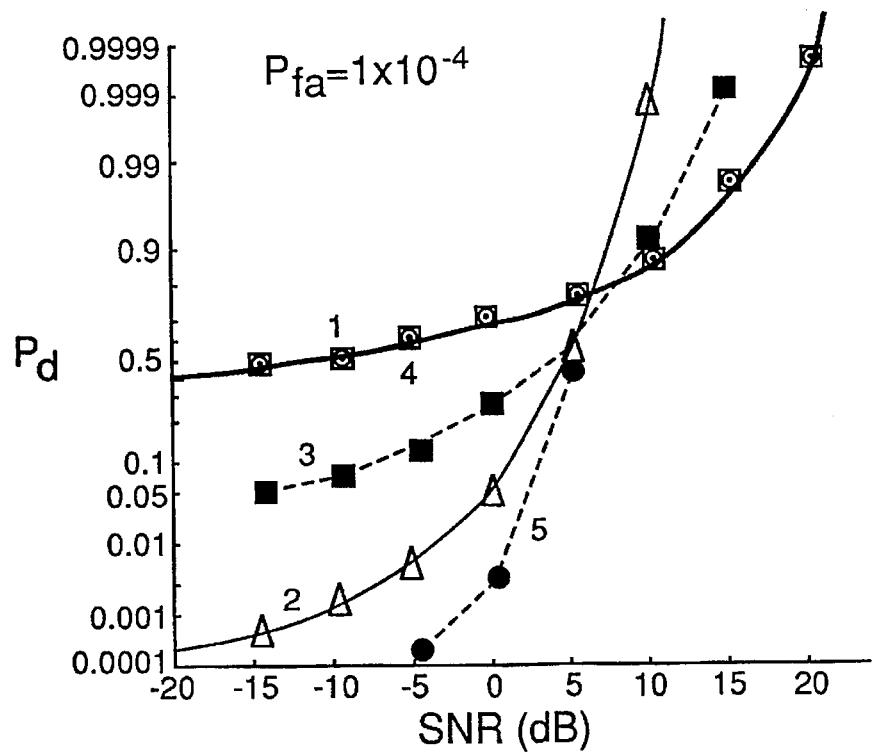
FIG. 5 is a chart of the probability of detection versus SNR: known constant signal in white K-distributed SIRP noise; J=1, $N_T$=2 time samples and α=shape parameter; in curves 1((■)), 2 and 3, the receivers are matched to the α=0.1, α=0.5 and Gaussian noise, respectively; in curves 4(□) and 5, a K(α=0.5)-receiver is used with K-distributed α=0.1 and Gaussian noise, respectively; $P_{fa}$=1×10$^{-4}$.

The robustness of the non-Gaussian receiver is further explored in FIG. 5. Curves 1 and 2 of this figure are identical to those of FIG. 4. Curve 3 shows the case where the K-distributed SIRP has a shape parameter $\alpha=0.5$ and the receiver is matched to this condition. Curve 4 corresponds to the case where the interference is a K-distributed SIRP with a $\alpha=0.1$ while the receiver is designed for $\alpha=0.5$. Curve 5 pertains to the case where the interference is Gaussian and the receiver is designed for a K-distributed SIRP with $\alpha=0.5$. Comparison of curves 2 and 5 shows the loss in performance for this mismatched receiver case. Comparison of curves 1 and 4 indicates that performance penalty is insignificant for the mismatch. However, we observe that the receiver designed for $\alpha=0.5$ performs better than the receiver designed for $\alpha=0.1$ while dealing with Gaussian interference. In summary, we point out that the receiver designed for $\alpha=0.5$ is robust over a considerable range of shape parameter values.

The role of the ZMNL transformation is apparent in curves 1, 2 and 3. For the Gaussian receiver, $h_{2JN}(q)=\exp(-q)$. It follows that the ZMNL transformation, i.e., $h_{2JN}(q)$ is simply $-q$. However, for non-Gaussian SIRPs, $h_{2JN}(q)$ is a monotonically decreasing function. Therefore, large values of q are mapped to smaller values of the test statistic and vice versa. Consequently, the threshold can be lowered in a weak signal situation resulting in improved detection performance.

Figure 6:
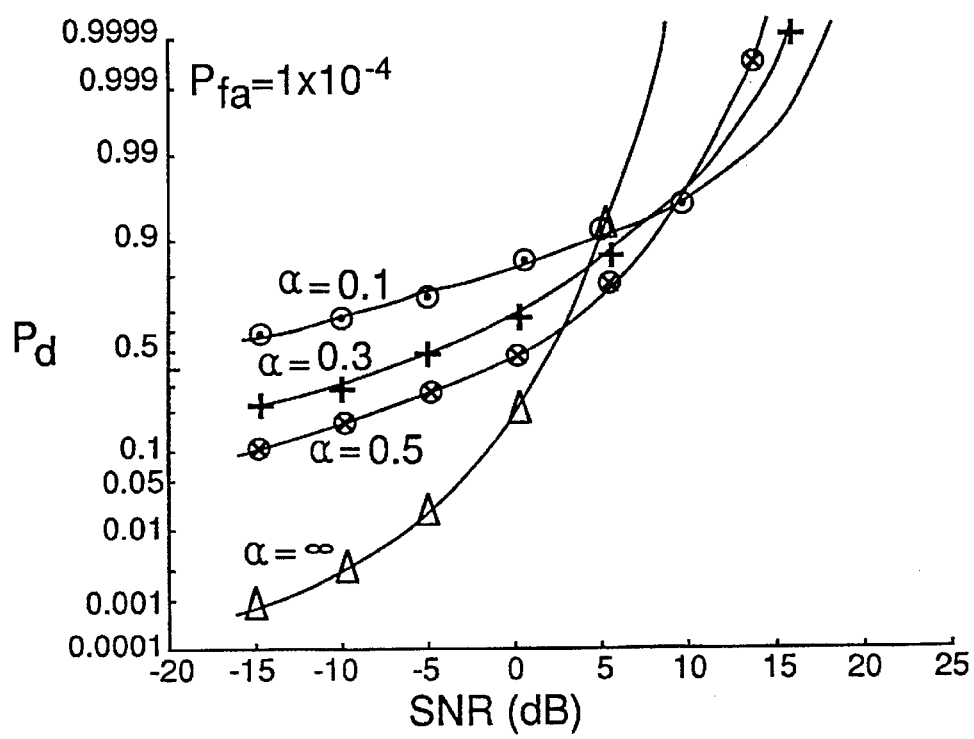
Figure 7:
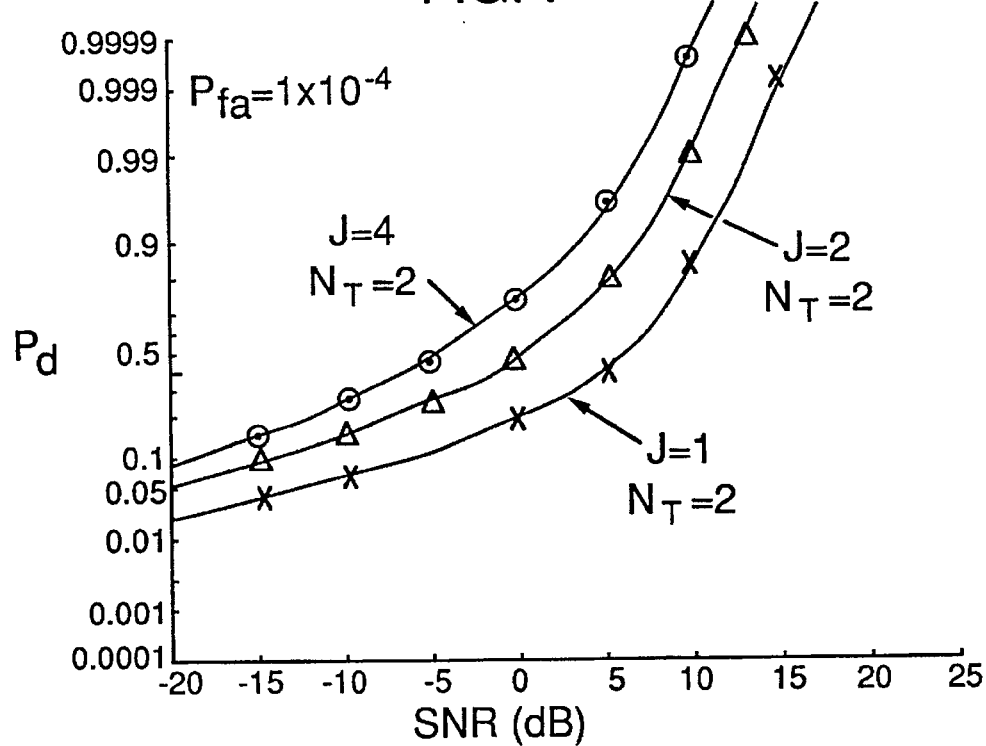

FIG. 6 shows the plot of $P_d$ versus SNR for the two channel (J=2) case using $N_T=2$ samples. For these results, equal channel signal-to-noise ratios $(SNR)_j$ were used with no cross-channel noise correlation. K-distributed white SIRPs were considered with shape parameters $\alpha=0.1$, 0.3 and 0.5. In addition, the case of the white Gaussian SIRP $(\alpha=\infty)$ is also considered. FIG. 7 shows the results for the case of a white K-distributed SIRP with $\alpha=0.5$ and $N_T=2$. The three curves show the results for the case of J=1, 2 and 4.

Figure 8:
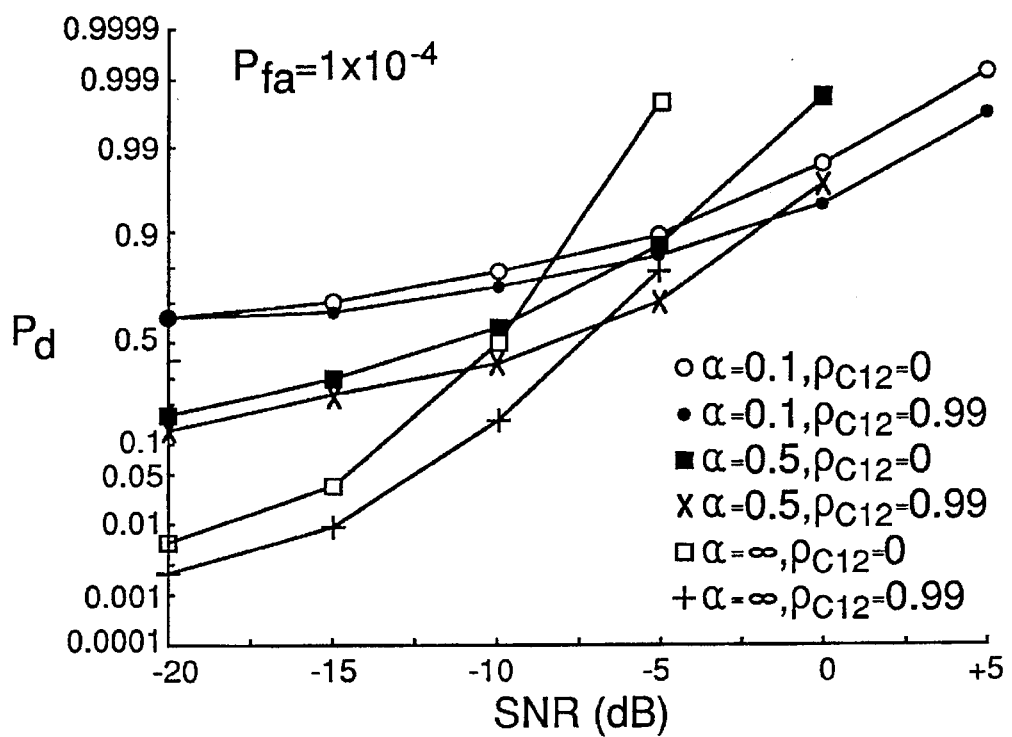

FIG. 8 contains the plots of $P_d$ versus signal to noise ratio (SNR) for a known constant signal in known interference modeled as K-distributed SIRP. The K-distributed SIRP was approximated as an AR(2) process with a normalized Doppler shift of 0.5. The results were obtained using J=2, $N_T=2$ and equal signal to noise ratios $(SNR)_j$, j=1,2. The one lag temporal correlation parameter on each channel was $\lambda_j=0.7$, j=1,2. The K-distributed SIRP with shape parameter values $\alpha=0.1$, 0.5 and $\infty$ was used. For each shape parameter value, the K-distributed SIRP was modeled with cross-channel correlation parameters Pij=0 and 0.99.

Figure 9:
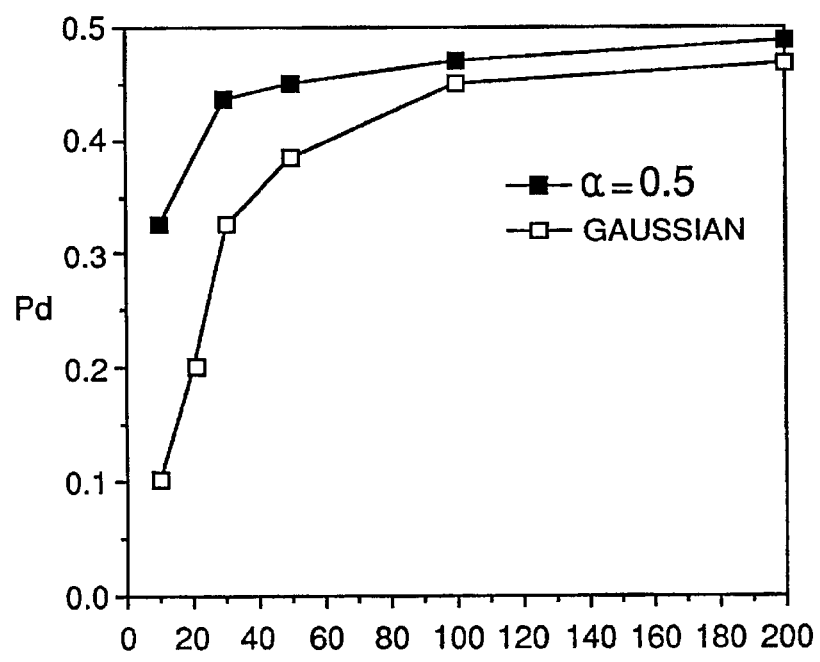

FIG. 9 considers the case where the K-distributed SIRP is approximated by an AR(2) process with unknown coefficients. These coefficients are estimated from the data for a signal to white noise ratio (SNR)=−10 dB. In this case, $N_{TC}$ data samples were used to estimate the AR(2) parameters using the multichannel Strand-Nuttall algorithm via the software discussed above. The plots show the convergence of the detection results to the corresponding known interference case presented in FIG. 6 as the estimator performance improves for large values of $N_{TC}$.

We discuss the estimator performance of the AR(2) coefficients pertaining to FIG. 7 below. In particular, we consider the J×1 multichannel AR vector as $$\tilde{Y}(k) = -\sum_{l=1}^{p} A(k)\tilde{Y}(k-l) + \tilde{U}(k) \quad (38)$$

where p is the model order A(k) is the J×J matrix and U(k) is the J×1 white noise driving vector with diagonal covariance matrix $\Sigma_u$. We concern ourselves with the estimates of A(k) and $\Sigma_u$.

The probability of detection shown in FIG. 6 is obtained by averaging the results of nine independent detection runs.

Figure 10:
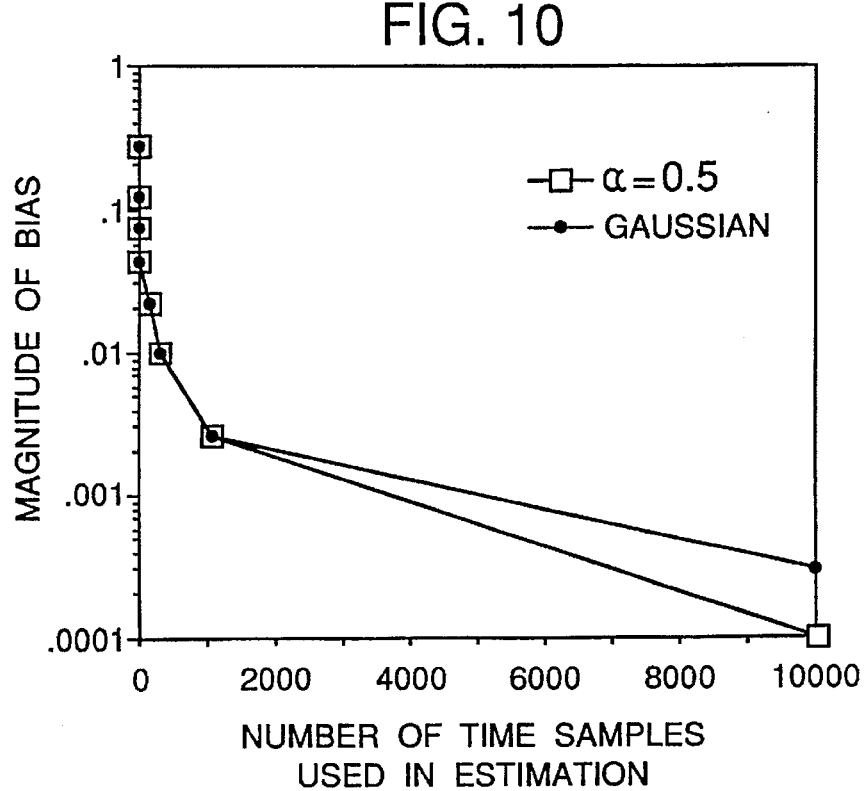
Figure 11:
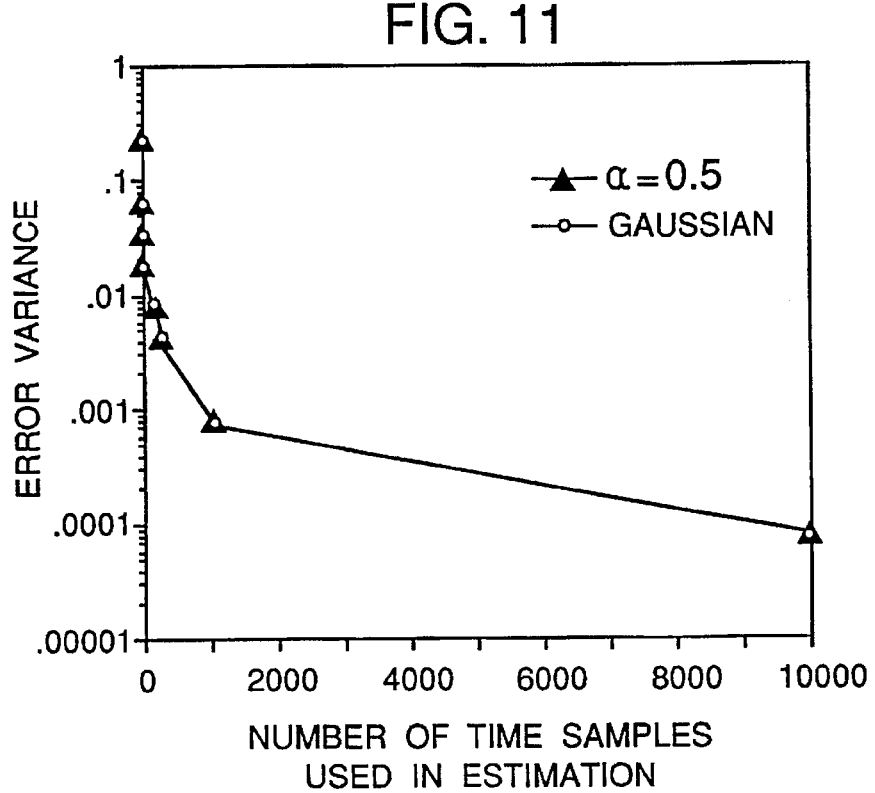

We explore the effect of estimator performance on the resulting detection performance. It is important to note that the detection probabilities converge to the values obtained for the known interference case of FIG. 5 for increasing values of $N_{TC}$. The estimator performamnce is shown in FIGS. 10–13. These figures enable us to understand the convergence of the results of FIG. 9 to those of FIG. 8 for increasing $N_{TC}$. In particular, FIGS. 10–13 present results pertaining to the estimates of A(k), k=1,2 and $\Sigma_u$. The estimates of A(k) and $\Sigma_u$ are denoted by $\hat{A}(k)$ and $\hat{\Sigma}_u$, respectively, where ˆ denotes estimate. We focus on the elements $a_{11}(1)$ and $\sigma_{u11}$ of the 2×2 matrices A(1) and $\Sigma_u$. Similar results are obtained for the other elements. In FIGS. 10 and 11 we plot the magnitude of the bias and error variance, respectively, as a function of the number of time samples $N_{TC}$ used in the estimate of $a_{11}(1)$. These quantities were computed via Monte-Carlo using 10,000 realizations of the process. The results are shown for a K-distributed SIRP with $\alpha=0.5$ as well as the Gaussian case $(\alpha=\infty)$. It is important to note that every realization of the SIRP corresponds to a fixed value of the random variable V. However, V is random from one realization to another. We emphasize that the SIRP is non-ergodic.

Figure 12A:
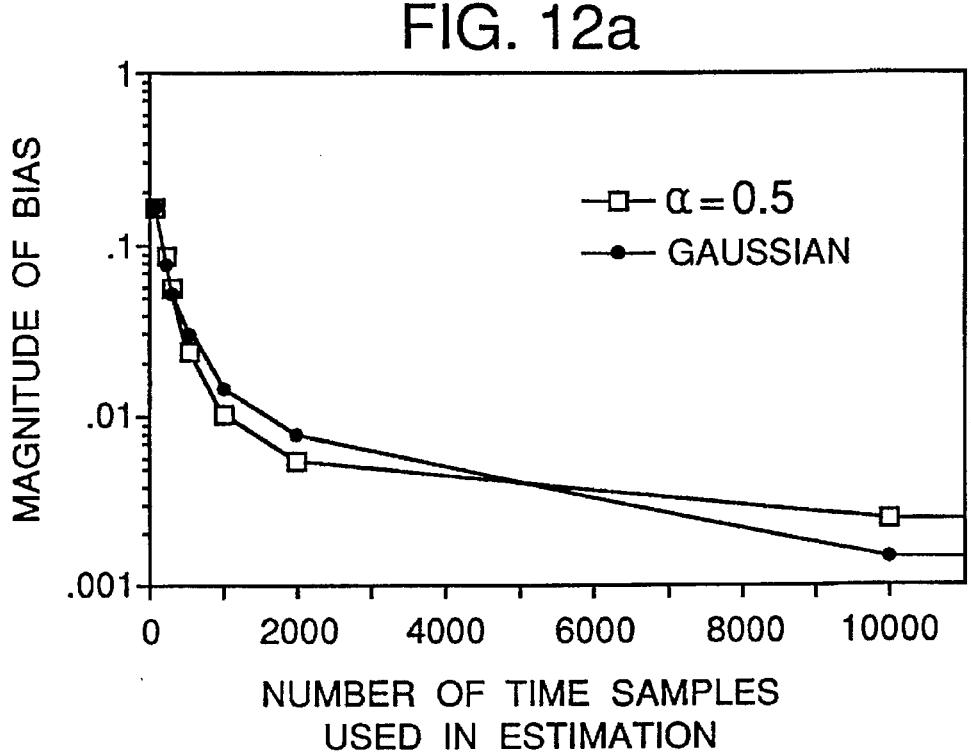
FIGS. 12a and 12b are charts of the magnitude of the bias versus the number of time samples $N_{TC}$ used in the time-averaged estimate of $\Sigma_{11}$ using K-distributed processes with a shape parameter α=0.5 and Gaussian processes; one-lag temporal correlation parameter $\lambda_{ii}$=0.7; a) expanded scale b) full scale.
Figure 12B:
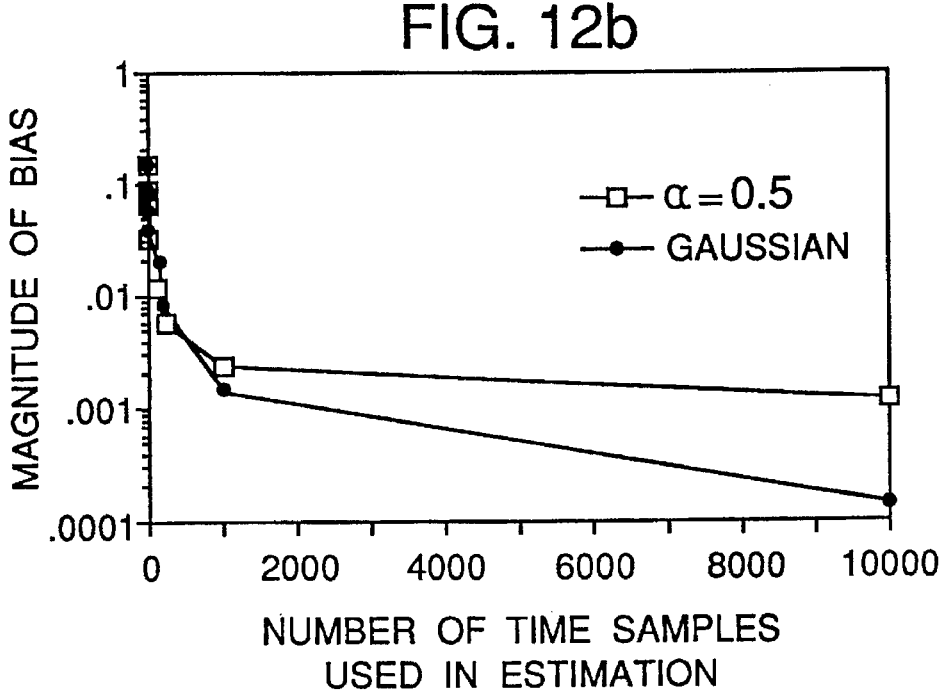

Observe that for $\hat{a}_{11}$, both the magnitude of the bias as well as the error variance falls off rapidly as $N_{TC}$ increases. This result applies for both the K-distributed SIRP as well as the Gaussian process. A similar result is seen for the magnitude of the bias of the estimator for $\hat{\sigma}_{u11}$ and is shown in FIGS. 12 and 13. However, FIG. 13 shows an interesting result. In this case, the error variance of $\sigma_{u11}$ decreases for increasing $N_{TC}$ for the Gaussian process. However, for the K-distributed SIRP, the error variance reaches a saturation level with increasing $N_{TC}$. Hence, the estimate $\hat{\sigma}_{u11}$ is inconsistent for SIRPs. The inconsistency of the estimator is due to:

1. Non ergodicity of the SIRP
2. The large tail behavior of the SIRP arising from small values of $\alpha$.

Consequently, the error variance of the estimator reaches a saturation level [and is reported here for SIRPs for the first time.] A similar result was reported while dealing with a different class of non-Gaussian phenomena.

We can now argue that the reduction in the level of the bias magnitude results in improvement of detection performance as $N_{TC}$ increases. Finally, we point out that the estimation error does not seem to affect detection performance. In particular, our results show that the receiver for the K-distributed SIRP is less sensitive to the estimation error as opposed to the Gaussian receiver.

This invention has made several significant original contributions. First, the complex-SIRP model for correlated non-Gaussian random processes was developed. Next, it was shown that the innovations process for complex-SIRPs can be obtained by using linear prediction filters. We then developed the IBDA for known signals in additive complex-SIRP interference using multichannel observations and showed that the resulting receiver was canonical. Finally, a performamnce analysis of the IBDA was carried out showing excellent performance.

Performance analysis of the IBDA also indicates that the receiver is robust for a variety of shape parameters. Furthermore, it was found that the receiver designed for the K-distributed SIRP is less sensitive to estimation errors arising from the estimates of the parameters of the AR process than the Gaussian receiver.

In a final review of the invention, consider the multichannel observation vector data process $y(n|H_i)$ under two hypotheses $H_0$ and $H_1$ where $H_0$ denotes the condition where no signal is present and $H_1$ denotes the signal present case. We consider $y(n|H_i)$ as a J×1 vector obtained from a general class of non-Gaussian processes known as Spherically Invariant Random Processes (SIRP's). It is well known in the theory of SIRP's, that $$\underline{y}(n|H_i) = \underline{z}(n|H_i)V \tag{39}$$

where V is a non-negative random variable and is statistically independent of $\underline{z}(n|H_i)$. We define the multichannel error vector $\underline{\epsilon}(n|H_i)$ of the observation data processes as $$\underline{\epsilon}(n|H_i) = \underline{y}(n|H_i) - \underline{\hat{y}}(n|n-1, H_i) \quad i=0,1 \tag{40}$$

where $\underline{\hat{y}}(n|n-1, H_i)$ denotes the estimate of $\underline{y}(n|H_i)$ based on past observation values. We define the conditional covariance matrix of $\underline{\epsilon}(n|H_i)$ as $$\Sigma_{k|k-1,v} = E[\underline{\epsilon}(n|H_i)\underline{\epsilon}^H(n|H_i)]. \tag{41}$$

A further $LDL^H$ decomposition of $\Sigma_{k|k-1,v}$ results in the quadratic form $$q_x \bigg| H_i = \sum_{j=1}^{J} \sum_{k=1}^{N} \frac{|\Gamma(k)|^2}{\sigma_{jk}^2} \quad (H_i) = q\bar{\Gamma} \bigg| H_i \tag{42}$$

where $\Gamma(k)$ is the complex zero mean, uncorrelated innovations vector having a diagonal covariance matrix $D_F|H_i$ and $\sigma^2_{jk}$ is the $jk^{th}$ diagonal component of $D_F|H_i$. The detection procedure consists of comparing the multichannel innovations-based likelihood ratio $\Lambda(T)$, with a suitable threshold $\eta$ which is determined based on a desired false alarm probability. Therefore, the multichannel innovations-based detection strategy takes the following mathematical form $$\ln \Lambda(\bar{\Gamma}) \underset{H_0}{\overset{H_1}{\gtrless}} \eta \tag{43}$$

where $$\Lambda(\bar{\Gamma}) = \sum_{j=1}^{J} \sum_{n=1}^{N} \{\ln[\sigma_{jn}^2(H_0)] - \ln[\sigma_{jn}^2(H_1)]\} + \tag{44}$$

$$\ln[h_{2JN}(q\bar{\Gamma}|H_1)] - \ln[h_{2JN}(q\bar{\Gamma}|H_0)]$$

$\sigma^2_{jk}(H_i)$ is the variance of the jth channel innovations process at time k and $h_{2JN}(q\bar{\Gamma}|H_i)$ is a monotonically decreasing function of the argument for all JN. For the case of K-distributed SIRVs, $$h_{2JN}(q\bar{\Gamma}|H_i) = \frac{2b^{2JN}}{\Gamma(\alpha)} (b\sqrt{q\bar{\Gamma}})^{\alpha - JN} K_{\alpha - JN}(2b\sqrt{q\bar{\Gamma}}) \tag{45}$$

While the the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A multichannel, non-Gaussian receiver for use with a host system, said host system receiving an observed data signal with a signal vector with a signal of interest obscured by Gaussian noise and non-Gaussian noise, said multichannel non-Gaussian receiver producing a detection signal containing $H_0$ when the signal of interest is not present in the observed data signal, and $H_1$ when the signal of interest is present in the observed data signal, said multichannel non-Gaussian receiver comprising:

a means for subtracting the signal vector from the observed data signal from the host system to produce thereby a first subtraction signal;

a means for estimating the signal of interest from the observed data signal to produce an estimate signal;

a first linear prediction error filter which processes the first subtraction signal and the estimate signal to produce thereby a first output signal which has data;

a second linear prediction error filter which processes the observed data signal from the host system with the estimate signal to produce a second output signal which has data;

a means for transforming the first output signal of the first linear prediction error filter based upon the probability distribution function (pdf) of the data of the first output signal;

a means for transforming the second output signals of the second linear prediction error filter based upon the probability distribution function (pdf) of the data of the second output signal;

a means for subtracting a second Gaussian equivalent signal from a first Gaussian equivalent signal to produce thereby a second subtraction signal; and a means for generating test statistic signals which receives and processes the second subtraction signal to produce thereby said detection signal for said host system via threshold comparison.

2. A multichannel, non-Gaussian receiver, as described in claim 1, wherein said estimating means comprises a data processor element which processes the observed data signal from the host system with a set of estimation algorithms to produce thereby said estimate signal.

3. A multichannel, non-Gaussian receiver, as described in claim 2, wherein said means for transforming the output signal of the first linear prediction error filter using a first zero memory nonlinear transformation unit.

4. A multichannel, non-Gaussian receiver, as described in claim 2, wherein said means for transforming the output signal of the second linear prediction error filter using a second zero memory nonlinear transformation unit.

5. A multichannel, non-Gaussian receiver, as described in claim 2, wherein said means for generating test statistic signals comprises a threshold comparison unit which receives and processes the second subtraction signal to produce thereby said detection signal for said host system.

6. A multichannel, non-Gaussian receiver, as in claim 1, wherein said means for transforming the first output signal of the first linear prediction error filter comprises a first zero memory nonlinear prediction error filter comprises a first zero memory nonlinear transformation unit.

7. A multichannel, non-Gaussian receiver, as described in claim 6, wherein said means for transforming the output signal of the second linear prediction error filter using a second zero memory nonlinear transformation unit.

8. A multichannel, non-Gaussian receiver, as described in claim 6, wherein said means for generating test statistic signals comprises a threshold comparison unit which receives and processes the second subtraction signal to produce thereby said detection signal for said host system.

9. A multichannel, non-Gaussian receiver, as described in claim 1, wherein said means for transforming the second output signal of the second linear prediction error filter comprises a second zero memory nonlinear prediction error filter comprises a second zero memory nonlinear transformation unit.

10. A multichannel, non-Gaussian receiver, as described in claim 9, wherein said means for generating test statistic signals comprises a threshold comparison unit which receives and processes the second subtraction signal to produce thereby said detection signal for said host system.

11. A multichannel, non-Gaussian receiver, as described in claim 1, wherein said means for generating test statistic signals comprises a threshold comparison unit which receives and processes the second subtraction signal to produce thereby said detection signal for said host system.

12. A multichannel, non-Gaussian receiver process for use with a host system, said host system receiving an observed data signal with a signal vector with a signal of interest obscured by either Gaussian noise or non-Gaussian noise, said multichannel non-Gaussian receiver process producing a detection signal for hypothesis $H_0$ when the signal of interest is not present in the observed data signal, and $H_1$ when the signal of interest is present in the observed data signal, said multichannel non-Gaussian receiver process comprising the steps of:

a first subtracting step that comprises subtracting the signal vector from the observed data signal from the host system to produce thereby a first subtraction signal;

estimating the signal of interest from the observed data signal to produce an estimate signal;

a first step which uses a first linear prediction error filter which processes the first subtraction signal and the estimate signal to produce thereby an output signal;

a second step which uses a second linear prediction error filter which processes the observed data signal from the host system with the estimate signal to produce an output signal;

a transforming step that comprises transforming the output signal of the first linear prediction error filter using a first ZMNL transformation unit;

a second transforming step that comprises transforming the output of the second linear prediction error filter using a second ZMNL transformation unit a second subtracting step that comprises subtracting the second ZMNL transformed signal from the first ZMNL transformed signal to produce thereby a second subtraction signal; and generating threshold signals from the second subtraction signal to produce thereby said detection signal for said host system.

13. A multichannel, non-Gaussian receiver process as described in claim 12, wherein said estimating step comprises using a data processor to obtain a signal amplitude estimate using $$\hat{a} = \frac{\tilde{s}_0^H \hat{\Sigma}^{-1} \underline{X}}{\tilde{s}_0^H \hat{\Sigma}^{-1} \tilde{s}_0}$$

where $\tilde{s}_O$ is a steering vector of the host system and $\hat{\Sigma}^{-1}$ is an inverse of an estimated data covariance matrix, and $\underline{X}$ is the observed data signal received by said host system.

14. A multichannel, non-Gaussian receiver process as described in claim 13, wherein said first and second using steps each comprise producing output signals using Kalman filters as said first and second linear prediction error filters.

15. A multichannel, non-Gaussian receiver process, as described in claim 14, wherein said first and second transforming steps each respectively comprise taking ln on where $h_{2JN}(q)$ represents the output signals of the first and second linear prediction error filters.

16. A multichannel, non-Gaussian receiver process, as described in claim 15, wherein said generating step comprises using a data processor to calculate $$q_* \left| H_i = \sum_{j=1}^{J} \sum_{k=1}^{N} \frac{|\tilde{\Gamma}(k|H_i)|^2}{\sigma_{ji}^2(k|H_i)} = q_{\tilde{r}} \right| H_i \quad i = 0,1$$

where $H_0$ denotes the condition where no signal of interest is present in the observed data signal and $H_1$ denotes that the signal of interest is present in the observed data signals received by the host system and wherein $G_j^2(k)$ is the associated estimated variances of the error signals.

* * * * *